US012659695B2

(12) United States Patent
Ding et al.

(10) Patent No.: US 12,659,695 B2
(45) Date of Patent: Jun. 16, 2026

(54) ACCESS POINT POSITIONING

(71) Applicant: TP-Link Systems Inc., Irvine, CA (US)

(72) Inventors: Tong Ding, Shanghai (CN); Jia Xin Chen, Shenzhen (CN)

(73) Assignee: TP-Link Systems Inc., Irvine, CA (US)

( * ) Notice: Subject to any disclaimer, the term of this patent is extended or adjusted under 35 U.S.C. 154(b) by 0 days.

(21) Appl. No.: 18/822,193

(22) Filed: Aug. 31, 2024

(65) Prior Publication Data

US 2026/0067640 A1      Mar. 5, 2026

(51) Int. Cl.
H04W 4/029 (2018.01)
G01S 5/02 (2010.01)

(52) U.S. Cl.
CPC ........... H04W 4/029 (2018.02); G01S 5/0244 (2020.05)

(58) Field of Classification Search
CPC ..... H04W 4/029; H04W 64/00; H04W 28/18; H04W 4/025; H04W 4/026; H04W 52/242
USPC ... 455/456.1, 456.6, 406, 456.5, 457, 456.3, 455/404.2, 431, 446, 408, 413
See application file for complete search history.

(56) References Cited

U.S. PATENT DOCUMENTS

| | | | |
|---|---|---|---|
| 9,432,964 B2 | 8/2016 | Garin | |
| 11,226,392 B1 * | 1/2022 | Castagnoli | G16H 70/60 |
| 2013/0005297 A1 * | 1/2013 | Sanders | H04W 4/029 |
| | | | 455/406 |
| 2013/0005349 A1 * | 1/2013 | Sanders | G01S 5/12 |
| | | | 455/456.1 |

| | | | |
|---|---|---|---|
| 2014/0141803 A1 * | 5/2014 | Marti | G01C 21/206 |
| | | | 455/456.2 |
| 2014/0171114 A1 * | 6/2014 | Marti | G01S 5/017 |
| | | | 455/456.2 |
| 2014/0273929 A1 * | 9/2014 | Torgersrud | H04M 15/09 |
| | | | 455/406 |
| 2016/0323717 A1 * | 11/2016 | Friday | G01S 5/0278 |
| 2017/0180938 A1 * | 6/2017 | Smith | H04W 4/08 |
| 2017/0287085 A1 * | 10/2017 | Smith | G01S 5/0244 |
| 2018/0020329 A1 * | 1/2018 | Smith | H04W 4/08 |

(Continued)

FOREIGN PATENT DOCUMENTS

CN      107124696 A      9/2017

OTHER PUBLICATIONS

Eldad Perahia et al., Cambridge. Next Generation Wireless LANs. 802.11n and 802.11ac. 2Ed. 2013. Chapter 3.5: 802.11n and 802. 11ac propagation model, 72 pages, downloaded Apr. 3, 2017.

(Continued)

*Primary Examiner* — Joseph Arevalo
(74) *Attorney, Agent, or Firm* — Loeb & Loeb LLP

(57) ABSTRACT

Disclosed are a method, an access point (AP) and a computer program product for determining location of the AP. A location information of a communication device wirelessly coupled to the AP may be received, the location information including a first location uncertainty with a first confidence level. A distance between the AP and the communication device may be determined based at least on a measured signal strength of a signal received from the communication device. Location information of the AP may be determined based at least on the distance and the location information of the communication device. A second location uncertainty with a second confidence level may be determined based on the distance and the first location uncertainty as at least a portion of the location information of the AP.

12 Claims, 4 Drawing Sheets

(56) References Cited

U.S. PATENT DOCUMENTS

| 2021/0227489 | A1 | | 7/2021 | Henry | |
| 2021/0239850 | A1 | * | 8/2021 | Castagnoli | .......... G01S 5/02528 |
| 2021/0243559 | A1 | * | 8/2021 | Castagnoli | ........... H04W 4/026 |
| 2022/0182785 | A1 | * | 6/2022 | Edge | .................... H04W 4/025 |
| 2023/0319507 | A1 | * | 10/2023 | Gummadi | ............. G01S 5/0236 |
| | | | | | 455/456.1 |
| 2023/0319766 | A1 | * | 10/2023 | Manolakos | ........... H04L 5/0051 |
| | | | | | 455/456.1 |
| 2024/0163837 | A1 | | 5/2024 | Lam | |

OTHER PUBLICATIONS

European Patent Office, Extended European Search Report issued in
App. No. EP25197376, dated Jan. 26, 2026, 10 pages.

* cited by examiner

200 receiving location information of a close proximity communication device wirelessly coupled to the AP — S202 determining a distance between the AP and the close proximity communication device — S204 determining location information of the AP based at least on the distance and the location information of the close proximity communication device — S206

400

500

ACCESS POINT POSITIONING

TECHNICAL FIELD

The present disclosure relates to wireless device management, and in particular, to methods, access points and computer program products for determining location of an access point (AP).

BACKGROUND

Currently, wireless APs are widely installed to provide wireless network services to one or more wireless client devices. APs enable client devices to wirelessly connect to a wired network using various wireless networking protocols and technologies, such as wireless local area networking protocols conforming to one or more of the IEEE 802.11 standards (i.e., "Wi-Fi"), Bluetooth/Bluetooth Low Energy (BLE), mesh networking protocols such as ZigBee or other wireless networking technologies.

With the use of consumer devices capable of providing wireless communication continuously expanding over the last few decades, radio frequency resources allocated to wireless communication have become increasingly congested. A wireless communication frequency band, e.g., a 6 Gigahertz (GHz) band, may be utilized for communication by incumbent radios. Other devices, e.g., Wi-Fi radios, may be required to honor the incumbent radios, when using the wireless communication frequency band. For example, a transmission power of non-incumbent radios, e.g., Wi-Fi radios, may be restricted, for example, to ensure that any interference from the non-incumbent radios to the incumbent radios will be low enough, e.g., 6 decibel (dB) below received incumbent signal power. The allocation of radio frequency resources and transmission powers for APs should consider the location of the APs. The conventional routers always have no positioning module, and thus if the installed positions of the routers are unknow, the geolocations of the routers are not available.

SUMMARY

In accordance with one embodiment of the present disclosure, there is provided a method for determining location of an access point (AP). In the method, a location information of a communication device wirelessly coupled to the AP may be received. The location information of the communication device may include a first location uncertainty with a first confidence level. A distance between the AP and the communication device may be determined. Location information of the AP may be determined based at least on the distance and the location information of the communication device. The determination of the location information of the AP may comprise determining, based on the distance and the first location uncertainty, a second location uncertainty with a second confidence level as at least a portion of the location information of the AP.

In accordance with another embodiment of the present disclosure, there is provided an access point (AP). The AP may comprise at least one processor, a memory coupled to the at least one processor, and a set of computer program instructions stored in the memory. When executed by the at least one processor, the set of computer program instructions may cause the at least one processor to perform the following actions: receiving a location information of a communication device wirelessly coupled to the AP, the location information including a first location uncertainty with a first confidence level; determining a distance between the AP and the communication device; and determining location information of the AP based at least on the distance and the location information of the communication device. The determination of the location information of the AP may comprise determining, based on the distance and the first location uncertainty, a second location uncertainty with a second confidence level as at least a portion of the location information of the AP.

In accordance with a further embodiment of the present disclosure, there is provided a computer program product for determining location of an access point (AP). The computer program product may comprise non-transitory computer readable storage medium having program instructions embodied therewith. The program instructions are executable by a processor to cause the processor to: receive a location information of a communication device wirelessly coupled to the AP, the location information including a first location uncertainty with a first confidence level; determine a distance between the AP and the communication device; and determine location information of the AP based at least on the distance and the location information of the communication device. The determination of the location information of the AP may comprise determining, based on the distance and the first location uncertainty, a second location uncertainty with a second confidence level as at least a portion of the location information of the AP.

In accordance with the embodiments of the present disclosure, through determining the location information of the AP based on the location information of the communication device wireless coupled to the AP, the conventional router without positioning module can obtain its location information. Moreover, by determining the location uncertainty of the AP with the second confidence interval based on the location uncertainty of the communication device with the first confidence interval, the determined location information of the AP meets the corresponding location confidence requirement, so that the location information of the AP may be used for further decisions under the corresponding location confidence.

BRIEF DESCRIPTION OF THE DRAWINGS

For the purpose that the present disclosure may be understood in detail, a more particular description of the present disclosure, briefly summarized above, may be made by reference to embodiments, some of which are illustrated in the accompanying drawings, in which the same reference generally refers to the same components in the embodiments of the present disclosure.

Figure 1:
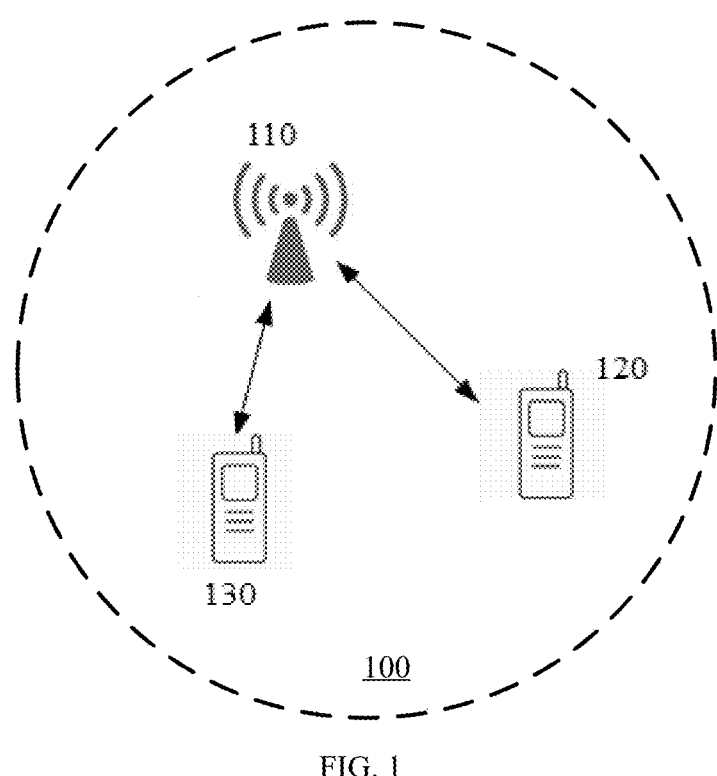
FIG. 1 illustrates a schematic diagram of a communication system 100 in accordance with some embodiments of the present disclosure.

One skilled in the art will appreciate that elements in the figures are illustrated for simplicity and clarity and have not necessarily been depicted to scale. For example, the dimensions of some of the elements in the illustrations, block diagrams or flowcharts may be exaggerated in respect to other elements to help an accurate understanding of the present embodiments.

DETAILED DESCRIPTION

The following detailed description refers to the accompanying drawings. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "determining", "receiving", "measuring", "obtaining", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The present disclosure may refer to an "AP", or access point. Generally, an AP is a source where wireless communications may be transmitted and received and are connected to a larger communications network, such as the Internet or LAN. An example device acting as an AP may be a wireless router.

FIG. 1 illustrates a schematic diagram of a communication system according to an embodiment of present disclosure.

As shown in FIG. 1, the communication system 100 may include an access point (AP) 110, communication devices 120 and 130. In some embodiments, the communication devices 120 and 130 may be close proximity communication device configured to communicate with the AP 110 using a wireless close proximity communication protocol, such as, near field communication (NFC), Bluetooth®, Bluetooth® Low Energy (BLE), infrared, a wireless local area network (WLAN) such as Wi-Fi® or Ethernet, a home area network, a building area network, a campus area network, or the like. In the embodiments illustrated in FIG. 1, mobile phones are used as examples of the communication devices 120 and 130. The AP 110 may be communicatively connected with the communication devices 120 and 130, and transmit the information originated from the AP 110 to the communication devices 120 and 130, receive the information from the communication devices 120 and 130, or relay the information originated from the one or more other communication entities to the communication devices 120 and 130. In FIG. 1, the AP 110 may receive signals from the communication devices 120 and 130, and measure a signal strength of these signals. In some embodiments, the received signals may contain location information of a communication device and frequency information about the communication frequency between the AP 110 and the communication devices.

Modifications, additions, or omissions may be made to the communication system 100 without departing from the scope of the present disclosure. For example, although there are only one AP and two communication devices shown in FIG. 1, the number of APs, the number of communication devices included in the communication system 100 are not limited.

Recently, the Federal Communications Commission (FCC) approved the use of the 6 GHz frequency band for wireless communication (e.g., Wi-Fi or similar broadband technology) with unlicensed devices on the condition that unlicensed devices do not interfere with devices (also referred to as licensed devices) that have received licenses to use the 6 GHz frequency band. The 6 GHz frequency band is a spectrum of radio frequencies ranging from 5.925 GHz to 7.125 GHz (or 1200 MHz of spectrum). This spectrum addition to wireless capability is an expansion that adds upwards of one hundred channels for unlicensed devices to utilize.

The FCC has issued a mandate that 6 GHz access points (AP) obtain authorization from an automated frequency coordination (AFC) system (e.g., AFC system (server) in the region) before operating in a standard power mode (e.g., mode that generates a maximum transmission power of 36 dBm). In some circumstances, an AP sends an AFC inquiry request, for example, a channel availability request, including operational characteristics. The operational characteristics may include, for example, a geolocation, a location confidence, an antenna height, an FCC ID, a serial number, and/or other device characteristics. The AFC system may determine a predicted interference on an incumbent system based on received operational characteristics, and thereby providing, to the AP, an AFC response, which may also be referred to a response to an AFC inquiry request, AFC request, AFC inquiry or AFC query. The AFC response may include information indicating available frequency spectrum (e.g., available channel) and power constraints thereon for the AP. The power constraint on a channel refers to a threshold operating power (e.g., maximum operating power) for the AP to operate on the channel while located within a geofence. It can be seen that the AP is required to obtain its location information, and then reports the location information to the AFC system. Those skilled in the art should appreciate that many scenarios other than AFC require the location information of the AP.

Figure 2:
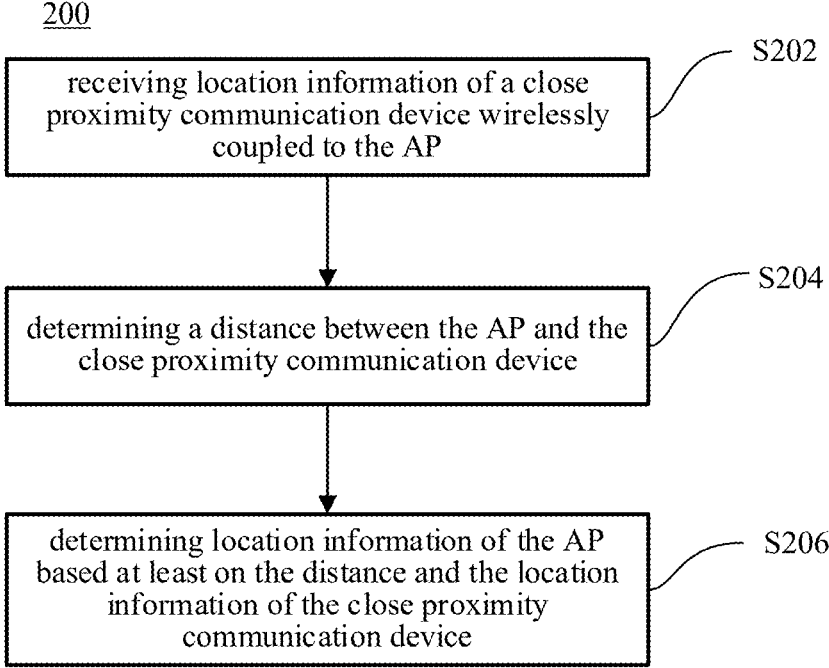
FIG. 2 illustrates a flowchart illustrating an exemplary method 200 for determining location of an AP in accordance with some embodiments of the present disclosure.

FIG. 2 illustrates a flowchart illustrating an exemplary method 200 for determining location of an AP (e.g., AP 110 in FIG. 1) in accordance with some embodiments of the present disclosure. Herein, the location may refer to geolocation.

The method 200, at step S202, includes receiving location information of a communication device (e.g., communication device 120 or 130 in FIG. 1) wirelessly coupled to the AP. As mentioned above, in some embodiments, the communication device may refer to a device that communicate with the AP using a wireless close proximity communication protocol, for example, a mobile device such as mobile phone, or another AP, etc. In some embodiments, the location information of the communication device may include a horizontal location and a vertical location (e.g., height), and the horizonal location may include longitude and latitude. In some embodiments, the location information may include a first location uncertainty with a first confidence level. Herein, the first location uncertainty refers to the location uncertainty of the communication device, and the first confidence level refers to the confidence level for the location of the communication device. The confidence level represents a degree to which the real value of the location has a certain probability of falling around the measured value of the location. The location uncertainty refers to an uncertain extent of a location and may represent an interval. The lower the location uncertainty, the higher the quality of the location. Therefore, the location uncertainty can be used to evaluate reliability of a location and thus increase comparability between locations.

Those skilled in the art should know that the communication device may obtain its location with a certain confidence level. The confidence level may also be referred to as confidence level herein. As an example, a mobile phone can obtain its location information by means of APIs in its operating system, such as Android or iOS, and the location information may have a confidence level of 68%. Specifically, the Android official API reference document describes APIs getAccuracy and getMslAltitudeAccuracyMeters as follows:

getAccuracy: Returns the estimated horizontal accuracy radius in meters of this location at the 68th percentile confidence level. This means that there is a 68% chance that the true location of the device is within a distance of this uncertainty of the reported location. Another way of putting this is that if a circle with a radius equal to this accuracy is drawn around the reported location, there is a 68% chance that the true location falls within this circle. This accuracy value is only valid for horizontal positioning, and not vertical positioning.

getMslAltitudeAccuracyMeters: Returns the estimated Mean Sea Level altitude accuracy in meters of this location at the 68th percentile confidence level. This means that there is 68% chance that the true Mean Sea Level altitude of this location falls within getMslAltitudeMeters( )+/− this uncertainty.

According to the above introductions, it can be known that, in some embodiments, the first location uncertainty with the first confidence level may include a first horizontal uncertainty with the first confidence level and a first vertical uncertainty with the first confidence level.

The method 200, at step S204, includes determining a distance between the AP and the communication device. The distance between the AP and the communication device may be determined based on various principles, such as power information of the received signal, time of fly (ToF) of the signal, etc.

The method 200, at step S206, includes determining location information of the AP based at least on the distance and the location information of the communication device. In some application scenarios, the AP needs a location uncertainty, which may be different from that can be provided by the communication device. For example, the AFC system requires the AP to provide its location with a confidence level of 95%, whereas a mobile phone can obtain its location with a confidence level of 68%, as mentioned above. It should appreciate that the confidence level about the location information that the AP requires may be different according to actual application, and on the other hand the communication device may obtain its location with different confidence levels depending on device type or means for obtaining the location etc. In some embodiments, determining the location information of the AP may comprise determining, based on the distance and the first location uncertainty, a second location uncertainty with a second confidence level as at least a portion of the location information of the AP. Herein, the second location uncertainty refers to the location uncertainty of the AP, and the second confidence level refers to the confidence level for the location of the AP.

Similar to the first location uncertainty, the second location uncertainty may include a second horizontal uncertainty with the second confidence level and a second vertical uncertainty with the second confidence level.

As mentioned above, the communication device may be configured to communicate with the AP using a wireless close proximity communication protocol, this represents that the communication device is within the communication range of the wireless close proximity communication protocol, i.e., being close to the AP. Thus, in some embodiments, the location information of the AP may include a horizontal location and a vertical location. In some embodiments, determining the location information of the AP may include determining the horizontal location of the communication device wireless coupled to the AP as the horizontal location of the AP, and determining the vertical location of the communication device as the vertical location of the AP.

Figure 3:
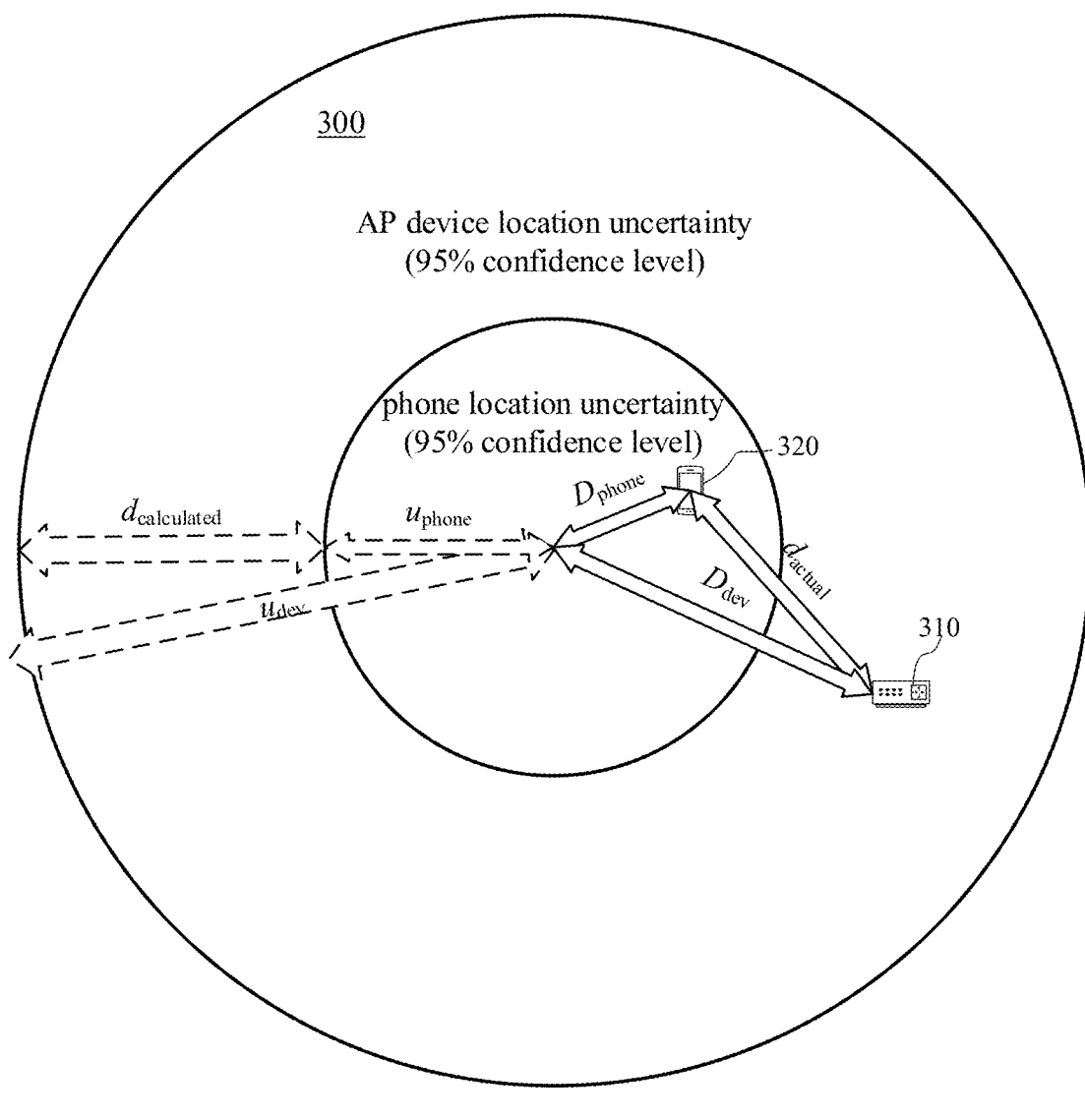
FIG. 3 illustrates a schematic diagram of an exemplary relationship between the uncertainties of the AP and the communication device in accordance with some embodiments of the present disclosure.

FIG. 3 illustrates a schematic diagram of an exemplary relationship between the uncertainties of the AP and the communication device in accordance with some embodiments of the present disclosure.

The "AP" 310 as shown in FIG. 3 could be a 6SD device, which refers to Standard Power Devices (SPDs) used in the 6 GHz band and need to comply with specific power limits and operating specifications. According to regulation 47 CFR Part 15 Subpart E updated by FCC, the 6SD device can be used in indoor and outdoor environments, could use U-NII Bands 5 and 7.

As shown in FIG. 3, there are two circles, wherein radius of the small circle represents the horizontal uncertainty of the measured horizontal location of the communication device, which is exemplary shown as a mobile phone 320 in FIG. 3, with a confidence level of 95%, and radius of the big circle represents the horizontal uncertainty of the horizontal location of the AP 310 with a confidence level of 95%. The measured horizontal location of the mobile phone 320 is at the center of the two circles, and the actual horizontal location of the mobile phone 320 has a distance from the measured horizontal location. As mentioned above, the horizontal location may be represented by longitude and latitude. Therefore, the distance D from the actual horizontal location to the measured horizontal location of the mobile phone 320 can be calculated according to the following equations (1)-(3):

$$\mathcal{L} = L - L_{measured}, \tag{1}$$

$$\mathcal{B} = B - B_{measured}, \tag{2}$$

$$\mathcal{D} = \sqrt{\mathcal{L}^2 + \mathcal{B}^2}, \tag{3}$$

wherein L represents the actual longitude, $L_{measured}$ represents the measured longitude of the mobile phone 320, $\mathcal{L}$ is a random variable representing longitude distance, B represents the actual latitude, $B_{measured}$ represents the measured latitude of the mobile phone 320, and $\mathcal{B}$ is a random variable representing latitude distance.

Since the random variables $\mathcal{L}$ and $\mathcal{B}$ are independent in two-dimensional plane and both comply with the normal distribution N with deviation $\sigma^2$, the distance $\mathcal{D}$ complies with Rayleigh distribution.

For the mobile phone 320, the random variables representing longitude and latitude distances of the mobile phone 320 can be calculated according to the following equations (4)-(5):

$$\mathcal{L}_{phone} = L_{phone} - L_{measured}, \tag{4}$$

$$\mathcal{B}_{phone} = B_{phone} - B_{measured}, \tag{5}$$

wherein $L_{phone}$ represents the actual longitude of the mobile phone, $L_{measured}$ represents the measured longitude of the mobile phone, $\mathcal{L}_{phone}$ is a random variable representing longitude distance of the mobile phone 320, $B_{phone}$ represents the actual latitude of the mobile phone 320, $B_{measured}$ represents the measured latitude of the mobile phone, and $\mathcal{B}_{phone}$ is a random variable representing latitude distance of the mobile phone 320.

The random variables $\mathcal{L}_{phone}$ and $\mathcal{B}_{phone}$ are independent and both comply with the normal distribution of $$N(0, \sigma^2_{phone}),$$

wherein $\sigma_{phone}$ represents normal distribution standard deviation for the random variables $\mathcal{L}_{phone}$ and $\mathcal{B}_{phone}$. Therefore, the cumulative distribution function for the distance $\mathcal{D}_{phone}$ between the actual and measured horizontal locations of the mobile phone 320 should be the following equation (6):

$$F_{\mathcal{D}_{phone}}(d) = P(\mathcal{D}_{phone} < d) = 1 - \exp\left(-\frac{d^2}{2\sigma^2_{phone}}\right), d > 0, \tag{6}$$

wherein P represents probability, and d is an independent variable representing the distance between two horizontal locations. The cumulative distribution function for the distance $\mathcal{D}_{phone}$ may represent the probability that the actual horizontal location of the mobile phone 320 is within a circle with ($L_{measured}$, $B_{measured}$) as the center and d as the radius. The cumulative distribution function for the distance $\mathcal{D}_{phone}$ under the uncertainty $u_{phone}$ of the horizontal location of the mobile phone 320 can be expressed by the following equation (7):

$$P(\mathcal{D}_{phone} < u_{phone}) = F_{\mathcal{D}_{phone}}(u_{phone}). \tag{7}$$

In general, the uncertainty $u_{phone}$ of the horizontal location with a confidence level can be calculated according to the condition that the cumulative distribution function for the distance $\mathcal{D}_{phone}$ under the uncertainty $u_{phone}$ conform to the confidence level.

This confidence level represents a probability that the mobile phone 320 is within the circle with ($L_{measured}$, $B_{measured}$) as the center and uncertainty $u_{phone}$ as the radius. As shown in FIG. 3, the small circle has a center of ($L_{measured}$, $B_{measured}$) and a radius of $u_{phone}$, and the probability that the mobile phone 320 is within the small circle is 95%, i.e., the confidence level is 95%.

As mentioned above, the mobile phone can obtain its location information having a confidence level of 68%, the AFC system requires the AP to provide its location with a confidence level of 95%. In order to conform to the requirement of the AFC system, the confidence level of 68% should be convert to 95%, that is, the radius of the circle will become greater. Supposing the uncertainty $u_{phone}$ of the horizontal location of the mobile phone 320 as $u_{phone,68}$ and $u_{phone,95}$ under the confidence levels of 68% and 95%, respectively, according to Rayleigh distribution, $u_{phone,68}$ and $u_{phone,95}$ comply with the following equation (8):

$$\begin{cases} 1 - \exp\left(-\dfrac{u^2_{phone,68}}{2\sigma^2_{phone}}\right) = 0.68 \\ 1 - \exp\left(-\dfrac{u^2_{phone,95}}{2\sigma^2_{phone}}\right) = 0.95 \end{cases} \tag{8}$$

The equation (8) can be solved to obtain the following equation (9):

$$u_{phone,95} = \sqrt{\log_{0.32} 0.05}\, u_{phone,68} = 1.6215 \cdot u_{phone,68}, \tag{9}$$

wherein 1.6215 is a horizonal coefficient for converting from the confidence level of 68% to the confidence level of 95% with Rayleigh distribution.

In addition, as shown in FIG. 3, an actual horizontal distance $d_{actual}$ represents the actual horizontal location of the AP 310 to the actual horizontal location of the mobile phone 320, and a distance $D_{dev}$ represents the actual horizontal location of the AP 310 to the measured horizontal location of the mobile phone 320. The distance $D_{dev}$ may be the maximum value of the actual horizontal distance $d_{actual}$ under the confidence level of 95%. Therefore, an uncertainty of the assumed horizontal location of the AP 310 with the confidence level of 95% should further consider the distance $D_{dev}$. For example, the uncertainty $u_{dev,95}$ of the horizontal location of the AP 310 under the confidence level of 95% can be calculated according to the following equation (10):

$$u_{dev,95} = d_{calculated} + u_{phone,95}, \tag{10}$$

wherein $d_{calculated}$ represents the calculated distance from the AP 310 to the mobile phone 320. The calculated distance $d_{calculated}$ should take the maximum value to consider the most conservative situation, so as to ensure the uncertainty conform to the required confidence level. Substituting equation (9) into equation (10), the following equation (11) is obtained:

$$u_{dev,95} = d_{calculated} + 1.6215 \cdot u_{phone,68}. \qquad (11)$$

As shown in FIG. 3, there is probability of 95% (i.e., confidence level) that the AP 310 is within the circle with ($L_{measured}$, $B_{measured}$) as the center and uncertainty $u_{dev,95}$ as the radius, i.e., the big circle in FIG. 3.

The above describes calculation of the horizontal uncertainty of the AP with respect to FIG. 3, similar calculation applies to the vertical uncertainty of the AP. As mentioned above, the location information of the AP includes a vertical location, for example height, and the vertical location of the communication device is determined as the vertical location of the AP. The actual vertical location of the mobile phone 320 has a distance from the measured vertical location. The vertical distance $D_v$ from the actual vertical location to the measured vertical location of the mobile phone 320 can be calculated according to the following equation (12):

$$D_v = H_{phone} - H_{measured}, \qquad (11)$$

wherein $H_{phone}$ represents the actual height of the mobile phone 320, and $H_{measured}$ represents the measured height of the mobile phone 320. The vertical distance $D_v$ complies with the normal distribution of $$N(0, \sigma^2_{phone}),$$

wherein $\sigma_{phone}$ represents normal distribution standard deviation for the vertical distance $D_v$ under the confidence level for the uncertainty of the vertical location of the mobile phone 320. The confidence level may represent the probability that the actual vertical location of the mobile phone 320 is within an interval with $H_{measured}$ as the center and uncertainty $v_{phone}$ of the vertical location of the mobile phone 320 as the radius. The uncertainty $v_{phone}$ of the vertical location of the mobile phone 320 could be represented by the distance to the measured height $H_{measured}$ of the mobile phone 320.

Supposing the uncertainty $v_{phone}$ of the horizontal location of the mobile phone 320 as $v_{phone,68}$ and $v_{phone,95}$ under the confidence levels of 68% and 95%, respectively, according to normal distribution, $v_{phone,68}$ and $v_{phone,95}$ comply with the following equation (12):

$$v_{phone,95} = 2 \cdot v_{phone,68}. \qquad (12)$$

wherein 2 is a vertical coefficient for converting from the confidence level of 68% to the confidence level of 95% with normal distribution. The uncertainty $v_{dev,95}$ of the vertical location of the AP 310 under the confidence level of 95% can be calculated according to the following equation (13):

$$v_{dev,95} = d_{calculated} + v_{phone,95}, \qquad (13)$$

wherein $d_{calculated}$ represents the calculated distance from the AP 310 to the mobile phone 320. The calculated distance $d_{calculated}$ should take the maximum value to consider the most conservative case, so as to ensure the uncertainty conform to the required confidence level. Substituting equation (12) into equation (13), the following equation (14) is obtained:

$$v_{dev,95} = d_{calculated} + 2 \cdot v_{phone,68}. \qquad (14)$$

Therefore, there is probability of 95% (i.e., confidence level) that the AP 310 is within the interval with $H_{measured}$ as the center and uncertainty $v_{dev,95}$ as the radius.

Although the above description is based on the assumption that the mobile phone obtains its location information having a confidence level of 68%, and the AP is required to provide its location with a confidence level of 95%, those skilled in the art would appreciate that the confidence level of the location information obtained by the mobile phone and the confidence level of the location information required by the AP could be other values due to various reasons. Therefore, the description with reference to FIG. 3 could be extended to general situations.

The mobile phone could obtain its location information, for example including ($L_{phone}$, $B_{phone}$, $u_{phone,t}$, $H_{phone}$, $v_{phone,t}$), wherein $L_{phone}$ represents the measured longitude of the mobile phone, $B_{phone}$ represents the measured latitude of the mobile phone, $u_{phone,t}$ represents the horizontal uncertainty of the mobile phone with the confidential level t, $H_{phone}$ represents the measured height of the mobile phone, and $v_{phone,t}$ represents the vertical uncertainty of the mobile phone with the confidential level t. The AP may determine its location information from the location information of the mobile phone, the location information of the AP may include for example ($L_{dev}$, $B_{dev}$, $u_{dev,s}$, $H_{dev}$, $v_{dev,s}$), wherein $L_{dev}$ represents the longitude of the AP, $B_{dev}$ represents the latitude of the AP, $u_{dev,s}$ represents the horizontal uncertainty of the AP with the confidential level s, $H_{dev}$ represents the height of the AP, and $v_{dev,s}$ represents the vertical uncertainty of the AP with the confidential level s. Based on the description above, the location information ($L_{dev}$, $B_{dev}$, $u_{dev,s}$, $H_{dev}$, $v_{dev,s}$) of the AP could be determined based on the location information ($L_{phone}$, $B_{phone}$, $u_{phone,t}$, $H_{phone}$, $v_{phone,t}$) of the mobile phone and the calculated distance $d_{calculated}$ between the mobile phone and the AP according to five equations (15)-(19) as follows:

$$L_{dev} = L_{phone}, \qquad (15)$$

$$B_{dev} = B_{phone}, \qquad (16)$$

$$H_{dev} = H_{phone}, \qquad (17)$$

$$u_{dev,s} = d_{calculated} + \lambda_{t,s} \cdot u_{phone,t}, \qquad (18)$$

$$v_{dev,s} = d_{calculated} + \tau_{t,s} \cdot v_{phone,t}, \qquad (19)$$

wherein $\lambda_{t,s}$ represents a horizonal coefficient for converting the confidential level t to the confidential level s, and $\tau_{t,s}$ represents a vertical coefficient for converting the confidential level t to the confidential level s. Those skilled in the art should appreciate that modifications to equations (15)-(19) can be made as appropriate, for example, addition of constants, coefficients, etc.

It can be seen that before determining the uncertainties of the AP, it is required to estimate the distance between the mobile phone and the AP. There are various approaches to calculate the distance between two communication devices, for example a mobile phone and an AP, using received signal strength indicator (RSSI) or ToF, among others.

In some embodiments, the mechanism for determining the distance between the mobile phone and the AP using ToF may refer to fine time measurement (FTM) mechanism. In some embodiments, the FTM mechanism may conform to 802.11az protocol. In some embodiments, the distance between the mobile phone and the AP may be determined based on a measured ToF during which a signal transmits between the mobile phone and the AP. For example, the distance can be obtained by multiplying ToF by the speed of light. In some embodiments, the distance may be average value of a plural obtained distances.

Figure 4:
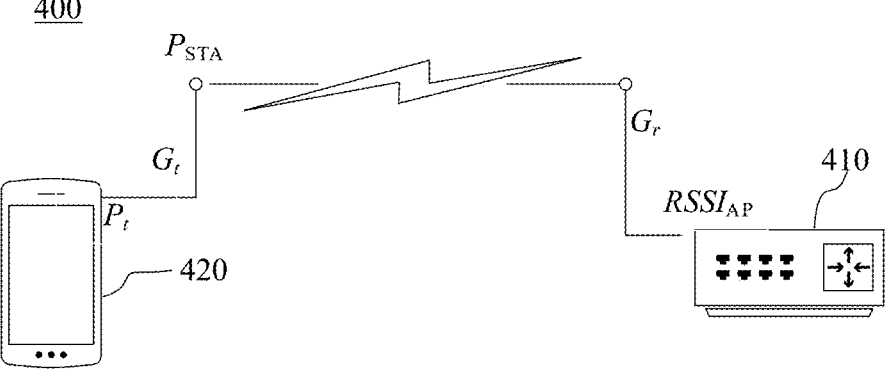
FIG. 4 illustrates a schematic diagram of signal strength of a signal transmitted between the mobile device 420 and the AP device 410 in accordance with some embodiments of the present disclosure.

In some embodiments, the distance between an AP and a communication device may be determined based at least on a measured signal strength of a signal received from the communication device. In some embodiments, the measured signal strength may refer to RSSI among others. In some embodiments, the measured signal strength may be an average signal strength of a plurality of signals received from the communication device. FIG. 4 illustrates a schematic diagram 400 of signal strength of a signal transmitted between the mobile device 420 and the AP device 410 in accordance with some embodiments of the present disclosure. In some embodiments, the AP device 410 may refer to standard power device.

In practical scenarios, since it is unclear whether there are obstacles between the mobile phone and the AP, in order to ensure that the distance estimated is greater than the actual distance between the mobile phone and the AP and to avoid affecting the confidence of the location uncertainties, when calculating the distance based on RSSI, it is assumed that there is no obstacles between they and LOS free space attenuation model is used, that is, the Friis formula is as follows:

$$PL_{FS}(d)|_{dB} = 20\log_{10}\left(\frac{4\pi df}{c}\right) = 20\log_{10}\left(\frac{4\pi}{c}\right) + 20\log_{10}(d) + 20\log_{10}(f) \quad (20)$$

wherein $PL_{FS}(d)$ represents the power loss in unit of dBm, d represents the distance between the transmitter and the receiver in unit of meter, f represents the communication frequency in unit of Hz, and c represents the speed of light in unit of $m \cdot s^{-1}$.

As shown in FIG. 4, the mobile phone 420 has a transmit power $P_T$ of the transmitter, which is amplified with a transmitter antenna gain $G_t$ to obtain a transmit power $P_{STA}$ of the mobile phone 420. The signal would have power loss passing from the mobile phone 420 to the AP device 410. The signal with the power loss would be detected by the receiver antenna of the AP device 410 with a receiver antenna gain $G_r$, so as to obtain a signal strength measured $RSSI_{AP}$ by the AP device 410. Since the mobile phone 420 cannot obtain RSSI, the actual measured path loss PL can be calculated according to equation (21) as follows:

$$PL = P_{STA} + G_r - RSSI_{AP}. \quad (21)$$

In practice, it is not easily to acquire the transmit power of the mobile phone 420. In the regulation of FCC, the maximum transmit power is limited. Considering the most conservative case, that is, the mobile phone 420 transmits with the maximum transmit power, the path loss would be maximized, and thus the farthest distance of the mobile phone 420 can be calculated under the $RSSI_{AP}$ condition measured by the AP device 410, so as to further calculate the uncertainty of the location information of the AP device 410. In some embodiments, the maximum transmit power of client devices (for example the mobile phone 420 in FIG. 4) in different frequency bands can be used to replace the actual transmit power of the mobile phone, that is, $P_{STA}$ adopts the maximum transmit power of the mobile phone in the current frequency band.

Table 1 shows the maximum transmit power of the mobile phone in different frequency bands as follows:

TABLE 1

| The maximum transmit power of the mobile phone | | |
|---|---|---|
| Frequency band | Frequency range/GHz | The maximum transmit power (EIRP, including gain)/dBm |
| 2.4 G | 2.4~2.4835 | 30 |
| 5 G | band1: 5.15~5.25 | 24 |
| | band2: 5.25~5.35 | 24 |
| | band3: 5.47~5.725 | 24 |
| | band4: 5.725~5.825 | 30 |
| 6 G | band5: 5.925~6.425 | 30 |
| | band6: 6.425~6.525 | 12 |
| | band7: 6.525~6.875 | 30 |
| | band8: 6.875~7.125 | 12 |

It can be seen from Table 1, when the mobile phone operates at 2.4G frequency band, the maximum transmit power $P_{STA}$ of the mobile phone would be 30 dBm.

According to equations (20)-(21), the model for distance estimation could be expressed by equation (22) as follows:

$$P_{STA} + G_r - RSSI_{AP} = 20\log_{10}\left(\frac{4\pi}{c}\right) + 20\log_{10}(d) + 20\log_{10}(f) \quad (22)$$

wherein $P_{STA}$ represents the transmit power in unit of dBm, $G_r$ represents the receiver antenna gain of the AP device in unit of dBi, $RSSI_{AP}$ represents the signal strength measured by the AP device in unit of dBm, d represents the distance between the mobile device and the AP device in unit of meter, f represents the communication frequency in unit of Hz, and c represents the speed of light in unit of $m \cdot s^{-1}$.

The equation for calculating distance d between the mobile device and the AP device could be induced from equation (22) as follows:

$$d = 10^{\frac{P_{STA}+G_r-RSSI_{AP}-20\log_{10}(f)-20\log_{10}\left(\frac{4\pi}{c}\right)}{20}} = \frac{c}{4\pi f} \times 10^{\frac{P_{STA}+G_r-RSSI_{AP}}{20}} \quad (23)$$

Table 2 shows the calculated distance d with $P_{STA}$ of 30 dBm and $G_r$ of 5 dBi as follows:

TABLE 2

Distance/m predicted by Friis formula with reference to $RSSI_{AP}$ in different frequencies

| $RSSI_{AP}$ | Frequency | | | | | |
|---|---|---|---|---|---|---|
| | 2.402 GHz | 2.483 GHz | 5.150 GHz | 5.850 GHz | 5.925 GHz | 7.125 GHz |
| −10 dBm | 1.767 | 1.710 | 0.824 | 0.726 | 0.717 | 0.596 |
| −15 dBm | 3.143 | 3.040 | 1.466 | 1.290 | 1.274 | 1.060 |
| −20 dBm | 5.589 | 5.407 | 2.607 | 2.295 | 2.266 | 1.884 |
| −25 dBm | 9.939 | 9.615 | 4.636 | 4.081 | 4.029 | 3.351 |
| −30 dBm | 17.674 | 17.098 | 8.243 | 7.257 | 7.165 | 5.958 |
| −35 dBm | 31.430 | 30.404 | 14.659 | 12.905 | 12.742 | 10.596 |
| −40 dBm | 55.891 | 54.067 | 26.068 | 22.949 | 22.658 | 18.842 |
| −50 dBm | 176.741 | 170.976 | 82.434 | 72.570 | 71.651 | 59.584 |
| −60 dBm | 558.906 | 540.673 | 260.678 | 229.486 | 226.581 | 188.420 |
| −70 dBm | 1767.414 | 1709.758 | 824.336 | 725.697 | 716.511 | 595.836 |
| −80 dBm | 5589.055 | 5406.730 | 2606.779 | 2294.856 | 2265.808 | 1884.198 |

It can be seen from Table 2 that as compared with real engineering practice, for the same $RSSI_{AP}$, the distance predicted by Friis formula is much larger than the actual distance between the transmitter antenna and the receiver antenna. Thus, the uncertainty of the location information of the AP device is calculated in the most conservative way.

Figure 5:
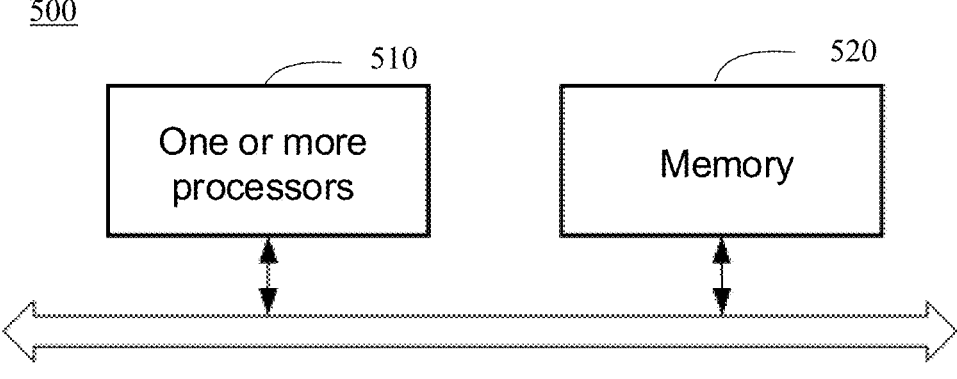
FIG. 5 shows a system 500 of determining location of an access point (AP) in accordance with some embodiments of the present disclosure.

FIG. 5 shows a system 500 of determining location of an access point (AP) in accordance with some embodiments of the present disclosure. The system 500 of determining location of the AP comprises one or more processors 510 and a memory 520 coupled to at least one of the processors 510. A set of computer program instructions are stored in the memory 520. When executed by at least one of the processors 510, the set of computer program instructions perform following series of actions. A location information of a communication device wirelessly coupled to the AP may be received. The location information may include a first location uncertainty with a first confidence level. The first location uncertainty may be substantially similar as the location uncertainty of the mobile phone. A distance between the AP and the communication device may be determined. Location information of the AP may be determined based at least on the distance and the location information of the communication device. The action of determining the location information of the AP may comprise determining, based on the distance and the first location uncertainty, a second location uncertainty with a second confidence level as at least a portion of the location information of the AP. The second location uncertainty may be substantially similar as the location uncertainty of the AP.

In an embodiment, the first location uncertainty with the first confidence level includes a first horizontal uncertainty with the first confidence level and a first vertical uncertainty with the first confidence level. The first horizontal uncertainty may be substantially similar as the horizontal uncertainty of the mobile phone, and the first vertical uncertainty may be substantially similar as the vertical uncertainty of the mobile phone.

In an embodiment, the location information of the communication device further includes a horizontal location and a vertical location, and the location information of the AP further includes the horizontal location and the vertical location. In other words, the horizontal and vertical locations of the communication device may be determined as the horizontal and vertical locations of the AP since they are close to each other.

In an embodiment, the second location uncertainty includes a second horizonal uncertainty with the second confidence level, the second horizonal uncertainty with the second confidence level being determined based on the first horizontal uncertainty and a first horizonal coefficient for converting from the first confidence level to the second confidence level, and the first horizonal coefficient is determined according to probability distribution of horizontal variance.

In an embodiment, the horizontal location includes longitude and latitude, and the probability distribution of horizontal variance is based on probability distribution of longitude variance and probability distribution of latitude variance.

In an embodiment, the second location uncertainty further includes a second vertical uncertainty with the second confidence level, the second vertical uncertainty with the second confidence level being determined based on the first vertical uncertainty and a second vertical coefficient for converting from the first confidence level to the second confidence level, and the second vertical coefficient is determined according to probability distribution of vertical variance. The second vertical uncertainty may be substantially similar as the vertical uncertainty of the AP.

In an embodiment, the distance between the AP and the communication device is determined based on a measured signal strength of a signal received from the communication device, a receiving antenna gain of the AP and transmitting power of the communication device. In some examples, the measured signal strength of a signal received from the communication device may be an average measured signal strength of a plurality of signals received from the communication device.

In an embodiment, the transmitting power of the communication device is determined based on a frequency band on which the communication device communicates with the AP.

In an embodiment, the distance between the AP and the communication device is determined according to the following equation:

$$d = 10^{\frac{P_{STA}+G_r-RSSI_{AP}-20log_{10}(f)-20log_{10}\left(\frac{4\pi}{c}\right)}{20}} = \frac{c}{4\pi f} \times 10^{\frac{P_{STA}+G_r-RSSI_{AP}}{20}}$$

wherein, d is the distance between the AP and the communication device, $P_{STA}$ is the transmitting power of the communication device, $G_r$ is the receiving antenna gain of the AP, $RSSI_{AP}$ is the signal strength measured at the AP, f is a frequency on which the communication device communicates with the AP, and c is the speed of light.

In an embodiment, the location information of the AP is reported to an automated frequency coordination (AFC) entity. In some embodiments, the second confidence level meets requirement of the AFC service.

In addition, according to another embodiment of the present disclosure, a computer program product for determining location of an access point (AP) is disclosed. As an example, the computer program product comprises a non-transitory computer readable storage medium having program instructions embodied therewith, and the program instructions are executable by a processor. When executed, the program instructions cause the processor to perform one or more of the procedures described above, and details are omitted herein for conciseness.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The processor(s) may be an integrated circuit chip with signal processing capability. The processor may be a general processor, a digital signal processor (DSP), an application specific integrated circuit (ASIC), an off-the-shelf programmable gate array (FPGA) or other programmable logic devices, discrete gate or transistor logic devices, and discrete hardware components, for implementing or executing the methods, steps and logic blocks or the operations disclosed in the embodiments of the present application. The general processor may be a microprocessor or any conventional processor, and it may be X84 architecture or ARM architecture.

The nonvolatile storage medium (media) may be read-only memory (ROM), programmable read-only memory (PROM), erasable programmable read-only memory (EPROM), electrically erasable programmable read-only memory (EEPROM) or flash memory. It should be noted that the memories of the methods described in present application are intended to include, but are not limited to, these and any other suitable types of memories.

Reference to an element in the singular is not intended to mean "one and only one" unless specifically so stated, but rather "one or more." Similarly, reference to an element in the plural is not intended to mean "more than one" unless specifically so stated or being contradictory with the description elsewhere, but rather "one or more." Terms such as "if," "when," and "while" should be interpreted to mean "under the condition that" rather than implying an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.

It should be noted that the flowcharts and block diagrams in the attached drawings illustrate the possible architectures, functions and operations of the methods and apparatuses according to various embodiments of the present application. In this regard, each block in the flowchart or block diagram may represent a module, a program segment, or a part of code, which contains at least one executable instruction for implementing a specified logical function. It should also be noted that in some alternative implementations, the functions noted in the blocks may occur in a different order than those noted in the drawings. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, may be implemented by a dedicated hardware-based system that performs specified functions or operations, or by a combination of dedicated hardware and computer instructions The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

Throughout the description and claims of this specification, the word "comprise" and variations of the word, such as "comprising" and "comprises," means "including but not limited to," and is not intended to exclude, for example, other additives, components, integers or steps. "Exemplary" means "an example of and is not intended to convey an indication of a preferred or ideal embodiment. "Such as" is not used in a restrictive sense, but for explanatory purposes.

It should be noted that the above-mentioned examples illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfill the functions of several units recited in the claims. Any reference signs in the claims shall not be construed so as to limit their scope.

What is claimed is:

1. A method for determining location of an access point (AP), the method comprising:

receiving a location information of a communication device wirelessly coupled to the AP, the location information including a horizontal location having a first horizontal uncertainty with a first confidence level and a vertical location having a first vertical uncertainty with the first confidence level;

determining a distance between the AP and the communication device based at least on a measured signal strength of a signal received from the communication device, a receiving antenna gain of the AP and transmitting power of the communication device; and determining location information of the AP based at least on the distance and the location information of the communication device, wherein the location information of the AP includes the horizontal location and the vertical location, wherein determining the location information of the AP comprising:

determining, based on the distance, the first horizontal uncertainty and the first vertical uncertainty, a second location uncertainty with a second confidence level as at least a portion of the location information of the AP, wherein the second location uncertainty includes a second horizonal uncertainty with the second confidence level the second horizonal uncertainty with the second confidence level being determined based on the first horizontal uncertainty and a first horizonal coefficient for converting from the first confidence level to the second confidence level, and the first horizonal coefficient is determined according to probability distribution of horizontal variance.

2. The method of claim 1, wherein the horizontal location includes longitude and latitude, and the probability distribution of horizontal variance is based on probability distribution of longitude variance and probability distribution of latitude variance.

3. The method of claim 1, wherein the second location uncertainty further includes a second vertical uncertainty with the second confidence level, the second vertical uncertainty with the second confidence level being determined based on the first vertical uncertainty and a second vertical coefficient for converting from the first confidence level to the second confidence level, and the second vertical coefficient is determined according to probability distribution of vertical variance.

4. The method of claim 1, wherein the transmitting power of the communication device is determined based on a frequency band on which the communication device communicates with the AP.

5. The method of claim 1, wherein the distance between the AP and the communication device is determined according to the following equation:

$$d = 10^{\frac{P_{STA}+G_r-RSSI_{AP}-20log_{10}(f)-20log_{10}\left(\frac{4\pi}{c}\right)}{20}} = \frac{c}{4\pi f} \times 10^{\frac{P_{STA}+G_r-RSSI_{AP}}{20}}$$

wherein, d is the distance between the AP and the communication device, $P_{STA}$ is the transmitting power of the communication device, $G_r$ is the receiving antenna gain of the AP, $RSSI_{AP}$ is the signal strength measured at the AP, f is a frequency on which the communication device communicates with the AP, and c is the speed of light.

6. The method of claim 1, wherein the location information of the AP is reported to an automated frequency coordination (AFC) entity.

7. An access point (AP), comprising:

at least one processor;

a memory coupled to the at least one processor; and a set of computer program instructions stored in the memory, which, when executed by the at least one processor, causes the at least one processor to:

receive a location information of a communication device wirelessly coupled to the AP, the location information including a horizontal location having a first horizontal uncertainty with a first confidence level and a vertical location having a first vertical uncertainty with the first confidence level;

determine a distance between the AP and the communication device based at least on a measured signal strength of a signal received from the communication device, a receiving antenna gain of the AP and transmitting power of the communication device; and determine location information of the AP based at least on the distance and the location information of the communication device, wherein the location information of the AP includes the horizontal location and the vertical location, wherein determining the location information of the AP comprising:

determining, based on the distance, the first horizontal uncertainty and the first vertical uncertainty, a second location uncertainty with a second confidence level as at least a portion of the location information of the AP, wherein the second location uncertainty includes a second horizonal uncertainty with the second confidence level, the second horizonal uncertainty with the second confidence level being determined based on the first horizontal uncertainty and a first horizonal coefficient for converting from the first confidence level to the second confidence level, and the first horizonal coefficient is determined according to probability distribution of horizontal variance.

8. The AP of claim 7, wherein the horizontal location includes longitude and latitude, and the probability distribution of distance between two horizontal locations is based on probability distribution of longitude variance and probability distribution of latitude variance.

9. The AP of claim 7, wherein the second location uncertainty further includes a second vertical uncertainty with the second confidence level, the second vertical uncertainty with the second confidence level being determined based on the first vertical uncertainty and a second vertical coefficient for converting from the first confidence level to the second confidence level, and the second vertical coefficient is determined according to probability distribution of vertical variance.

10. The AP of claim 7, wherein the transmitting power of the communication device is determined based on a frequency band on which the communication device communicates with the AP.

11. The AP of claim 7, wherein the distance between the AP and the communication device is determined according to the following equation:

$$d = 10^{\frac{P_{STA}+G_r-RSSI_{AP}-20log_{10}(f)-20log_{10}\left(\frac{4\pi}{c}\right)}{20}} = \frac{c}{4\pi f} \times 10^{\frac{P_{STA}+G_r-RSSI_{AP}}{20}}$$

wherein, d is the distance between the AP and the communication device, $P_{STA}$ is the transmitting power of the communication device, $G_r$ is the receiving antenna gain of the AP, $RSSI_{AP}$ is the signal strength measured at the AP, f is a frequency on which the communication device communicates with the AP, and c is the speed of light.

12. A computer program product for determining location of an access point (AP), the computer program product comprising non-transitory computer readable storage medium having program instructions embodied therewith, the program instructions executable by a processor to cause the processor to:

receive a location information of a communication device wirelessly coupled to the AP, the location information including a horizontal location having a first horizontal uncertainty with a first confidence level and a vertical location having a first vertical uncertainty with the first confidence level;

determine a distance between the AP and the communication device based at least on a measured signal strength of a signal received from the communication device, a receiving antenna gain of the AP and transmitting power of the communication device; and determine location information of the AP based at least on the distance and the location information of the communication device, wherein the location information of the AP includes the horizontal location and the vertical location, wherein determining the location information of the AP comprising:

determining, based on the distance, the first horizontal uncertainty and the first vertical uncertainty, a second location uncertainty with a second confidence level as at least a portion of the location information of the AP, wherein the second location uncertainty includes a second horizonal uncertainty with the second confidence level, the second horizonal uncertainty with the second confidence level being determined based on the first horizontal uncertainty and a first horizonal coefficient for converting from the first confidence level to the second confidence level, and the first horizonal coefficient is determined according to probability distribution of horizontal variance.

\* \* \* \* \*